March 5, 1968     C. E. JAMES     3,371,697
THREADED ELEMENTS WITH LOCKING KEYS
Filed April 22, 1966
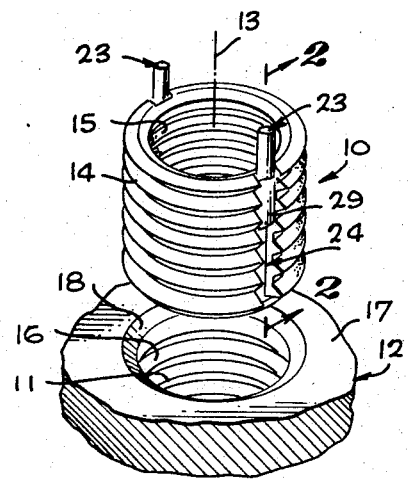
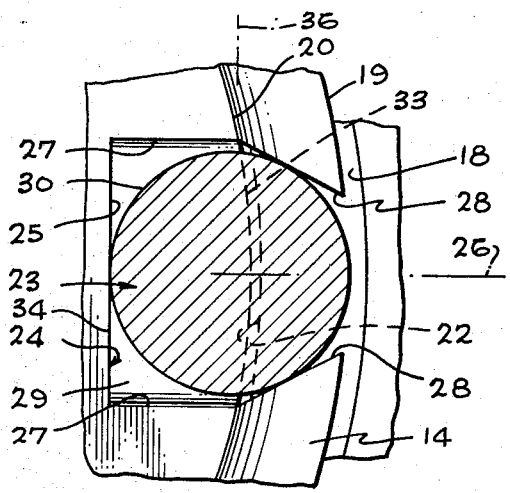
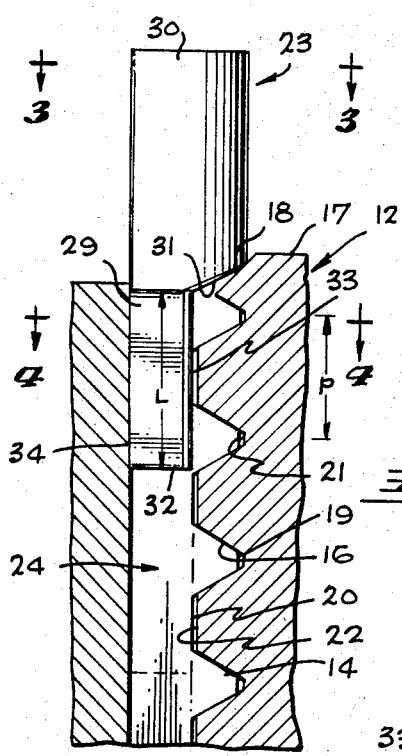
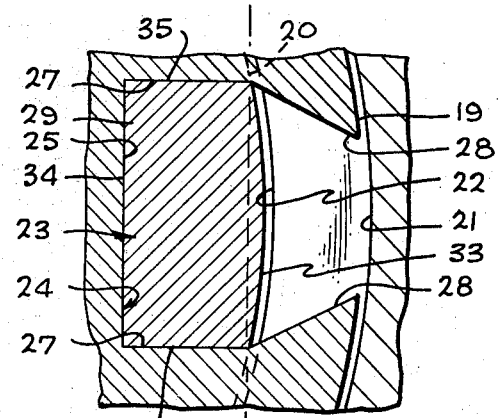
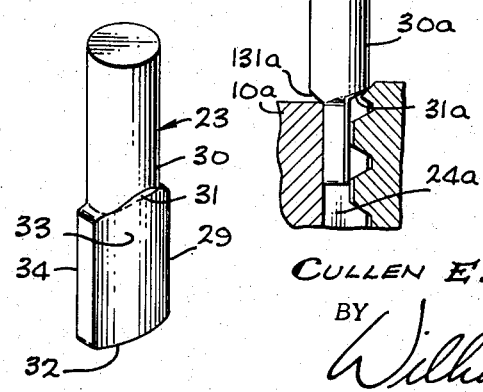
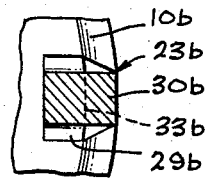
INVENTOR.
CULLEN E. JAMES
BY William P. Green
ATTORNEY

United States Patent Office 3,371,697
Patented Mar. 5, 1968

3,371,697
THREADED ELEMENTS WITH LOCKING KEYS
Cullen E. James, Southgate, Calif., assignor to Newton Insert Co., Los Angeles, Calif., a corporation of California
Filed Apr. 22, 1966, Ser. No. 544,446
2 Claims. (Cl. 151—23)

ABSTRACT OF THE DISCLOSURE

A fastener including an element having external threads through which an axial groove extends, with a locking key received in the groove and adapted to be driven axially therein to lock the element against removal from a carrier part. The key has a mounting portion frictionally retained within the groove and defined by a radially outer cylindrically curved surface, a radially inner planar surface, and two parallel planar surfaces extending generally radially therebetween. The key also has a locking portion which is axially outwardly of its mounting portion and is cylindrical and essentially tangent at its radially inner side to the plane of a planar inner wall of the groove. The groove has side walls which, in extending radially outwardly, have first parallel portions and outer converging dovetail portions, with the cylindrical locking portion of the key being of a width corresponding approximately to the width of the groove between its side walls.

---

This invention relates to improved threaded elements which are adapted to be screwed into carrier parts, and which have one or more locking keys for retaining the element within the carrier part after installation. The keys are of the general type disclosed and claimed in U.S. Patent No. 2,855,970, issued Oct. 14, 1958, entitled "Insert Having Frictionally Retained Key Which Upsets Threads of Base Member," inventor Robert Neuschotz.

A threaded element embodying the invention has external threads to be screwed into internal threads in the carrier part, and containing a groove extending generally axially through the threads for receiving a locking key in mounting relation. The key has an axially inner portion which is initially received within the groove but is thin enough radially to avoid substantial interference with the carrier part threads as the device is screwed into those threads. A second and axially outer portion of the locking key is thicker radially, and is constructed to cut axially through the material of the carrier part when the key is driven axially to a predetermined locking position, to thereby positively and effectively retain the element against unscrewing rotation.

As keys of this type have heretofore been formed, the thin, axially inner portions of the keys have normally been of rectangular cross section, transversely of the axis of the threads. As a result, these rectangular keys have presented corners at their radially outer extremities which have tended to contact and provide interference with the carrier part threads unless the radial thickness of this portion of the key has been made extremely thin. If made too thin, however, these portions of the keys may not have sufficient strength to serve the desired purpose of accurately locating the key within the groove, with an effectiveness preventing accidental dislocation of the key in handling prior to and during installation of the device within a carrier part. These problems have in some respects been especially acute in connection with miniature threaded elements, but are not necessarily limited to such miniature installations.

A major object of the present invention is to provide an improved key configuration which will enable an increase in the cross section and therefore strength of the thin axially inner portion of a key of the above discussed type without correspondingly increasing the tendency, if any, for contact of that portion of the key with the minor diameter of the carrier part threads upon initial instllation of the device. As will appear, the construction of a key embodying the invention may result in the elimination of the outwardly projecting corners which are normally present in a rectangular cross section key, and which have heretofore constituted the limiting factor controlling the maximum thickness of the discussed axially inner portion of the key.

In a key whose inner portion has the usual rectangular cross section, the radially outer surface of the thin portion of the key is usually substantially planar, that is, of substantially straight line configuration as viewed in transverse cross section. The advantages of the present invention are attained by so shaping this outer surface as to not be planar, but rather to have an outwardly bulging transverse section such that, as the outer surface advances circularly about the axis of the device from one side of the key receiving groove to its opposite side, the outer surface of the thin portion of the key projects radially outwardly beyond a true planar or true straight line configuration. Desirably, this outer surface is convexly curved, and preferably essentially arcuately about approximately the axis of the threads, so that the curvature of this element follows substantially the curvature of the minor diameter portions of the carrier part threads in optimum non-interfering relation.

At its radially inner side, the thin portion of the key desirably has a planar axially extending inner surface abutting against a correspondingly planar inner wall of the groove. The opposite sides of the groove are defined by two opposite side walls which, in extending generally radially outwardly, have first planar parallel portions engaging planar parallel side surfaces of the thin portion of the key, and have radially outer converging dovetail portions. The locking portion of the key is cylindrical and preferably substantially tangent to the plane of the mentioned inner wall of the groove.

The above and other features and objects of the invention will be better understood from the following detailed description of the typical embodiments illustrated in the accompanying drawing, in which:

FIG. 1 is a perspective representation of a threaded insert constructed in accordance with the invention;

FIG. 2 is an enlarged fragmentary axial section taken on line 2—2 of FIG. 1, through one of the keys of the device;

FIG. 3 is an enlarged fragmentary transverse section taken on line 3—3 of FIG. 2;

FIG. 4 is an enlarged fragmentary transverse section taken on line 4—4 of FIG. 2;

FIG. 5 is a perspective view of one of the locking keys separately;

FIG. 6 is a view similar to FIG. 2, but showing a slightly variational form of the invention; and FIG. 7 is a view similar to FIG. 3, but showing another form of the invention.

In FIG. 1, I have shown at 10 a threaded insert constructed in accordance with the invention, and adapted to be screwed into an opening 11 within a carrier part 12. The insert 10 is essentially tubular about an axis 13, having external threads 14 centered about that axis, and having internal threads 15 also centered about axis 13 and adapted to engage a mating screw, after the insert has been connected to carrier part 12, to thus attach the screw to the carrier part through the medium of the insert. It will also be apparent as the description progresses that the novel aspects of the invention may be applied to a stud rather than to the illustrated internally and externally threaded insert, in which event an upwardly or axially outwardly projecting externally threaded shank would be substituted for the internal threads 15. Recess or passage 11 within carrier part 12 contains internal threads 16 dimensioned in correspondence with, and adapted to engage, external threads 14 of insert 10, as brought out clearly in FIG. 2. The axially outer surface 17 of the carrier part may be disposed transversely of axis 13 of the insert and carrier part threads, with a short tapering countersink 18 typically being provided at the outer end of recess 11, adjacent surface 17.

As seen best in FIG. 2, the external threads 14 of insert 10 have major diameter portions 19, and preferably modified minor diameter portions 20 of an axial length greater than that normally provided in standard threads. Similarly, internal threads 16 within the carrier part have major diameter portions 21 and modified minor diameter surfaces or portions 22.

For locking the insert 10 within the carrier part, I provide one or more, preferably two, locking keys 23, which are received within and drivable axially along grooves 24 formed in the outer surface of the body of the insert. Where two such keys are provided they may be located at diametrically opposite positions on the insert, and desirably the two grooves 24 extend directly axially through external threads 14, to interrupt those threads at the location of each groove. More particularly, each groove may have the dovetail cross section illustrated in FIG. 3, with this cross section continuing along the entire length of the insert. At its radially inner side, each groove 24 may have an inner wall or surface 25, which may be planar and be disposed perpendicular to a radially extending plane represented at 26, which latter plane extends through and contains the axis 13 of the insert. This inner wall 25 of the groove is spaced radially inwardly a substantial distance beyond the diameter of minor diameter portions 20 and 21 of the insert and carrier part threads (see FIG. 4). In extending radially outwardly from the plane of inner wall 25, each groove 24 may be defined by two parallel planar opposite side walls 27, which may be parallel to and spaced equal distances from plane 26, and which may continue to approximately the diameter of minor diameter portions 20 and 21 of the threads. Radially outwardly beyond the side walls or surfaces 27, each groove may have outwardly converging side wall surfaces 28, which extend from approximately the minor diameter to the major diameter of threads 14, and which therefore interrupt those threads, and give to the groove the mentioned dovetail cross sectional configuration.

Keys 23 are initially frictionally held in the outwardly projecting positions illustrated in FIG. 1, in which positions they remain during handling prior to installation, and during the initial portions of the installing procedure, until these keys are ultimately driven axially to their locking positions. Each key has an axially inner portion 29 (FIGS. 2, 3 and 4), which is relatively thin radially, and which is initially received within the corresponding groove 24. Each key also has an axially outer portion 30, which is thicker radially, and which forms at its axially inner end a shoulder 31. Portion 30 may be cylindrical, of the circular cross section illustrated in FIG. 3. Preferably, the entire key is formed of a wire which initially has this circular cross section along its entire length, but which is deformed at one location to provide the flattened thin portion 29 of the key. Shoulder 31 may advance axially outwardly as it advances radially outwardly, as seen clearly in FIG. 2.

The thin portion 29 of key 23 has the cross section illustrated in FIG. 4, which cross section may be uniform along the entire axial length of portion 29, from its axially inner end 32 to the location of shoulder 31. It is also noted that this axial length of portion 29 is of sufficient extent that the radially outer surface 33 of portion 29 has portions received radially opposite both major diameter and minor diameter portions (22 and 21) of the carrier part threads 16. Desirably, the axial length L of portion 29 is at least as great as the pitch P of threads 14 and 16, and desirably greater than that pitch distance.

The radially inner side of portion 29 of the key may be defined by a planar axially extending wall 34, which abuts against and slidably engages inner wall 25 of groove 24. Similarly, the opposite sides of key portion 29 may form two planar parallel axially extending opposite sides surfaces 35, which engage and are tight frictional fits against wall surfaces 27 of the groove, to frictionally retain the keys in the position of FIGS. 1 and 2. At its radially outer side, portion 29 of each key has the previously mentioned radially outer surface 33, which is so shaped that, as it advances circularly from one of the side wall surfaces 35 to the opposite side surface 35, surface 33 bulges or projects radially outwardly beyond the true planar configuration which it would assume if surface 33 were to lie directly within the plane designated 36 in FIG. 4 (which plane may be disposed perpendicular to the plane 26 of FIG. 3). Preferably, the outwardly bulged cross sectional configuration of surface 33 is such as to give this surface an outwardly convexly curved outline (FIG. 4), which for best results is of arcuate curvature centered about the axis 13 of the insert. Also, surface 33 is so located as to be received approximately within the minor diameters 20 and 22 of threads 14 and 16, and may in the optimum arrangement be at a diameter substantially equalling minor diameter 20 of the insert. Stated differently, outer surface 33 may be cylindrical about axis 13 of the insert and the carrier part threads, with this cylindrical configuration continuing for the entire length L of portion 29 of the key.

To describe the installation of the insert 10, the first step is to screw insert 10 into recess 11 within carrier part 12, and to the position illustrated in FIG. 2. At that position, shoulders 21 of the keys engage the countersink of the carrier part to prevent further advancement of the insert. Next, a user drives the two keys 23 axially, by means of a hammer or other driving tool, from the full line position of FIG. 2 to the broken line position of that figure, so that portion 30 of each key cuts axially through the material of the carrier part, and particularly the threads of the carrier part, to form an effective interlock retaining the insert against rotation.

By virtue of the outwardly projecting and preferably convex configuration of outer surface 33 of portion 29 of each key, it is possible to maximize the cross sectional area of this portion of the key (see FIG. 4), while avoiding contact of that portion of the key with the carrier part threads (or minimizing that contact if some slight contact is in a particular installation desired or permissible). The optimum arrangement is of course that illustrated, in which surface 33 follows substantially the curvature of minor diameter surface 22 of the carrier part threads, so that an absolute maximum cross section is attained for portion 29 of the key. The cross sectional area of the key attained in FIG. 4 is obviously substantially greater than if outer surface 33 were planar, and disposed within plane 36 of that figure. Thus, added strength is attained in the portion 29 of the key to assure its capacity for effectively coacting with the insert body, and retaining the key in proper relation with respect to the body during handling and installation. If the outer surface 33 were of the discussed more conventional planar shape, the central portion of the surface would be spaced substantially from the minor diameter surfaces of the carrier part threads, while the corners 36 of the key cross section would almost contact those surfaces, or might actually ream out portions of those surfaces if an attempt were made to thicken the key to increase its strength while still maintaining the conventional rectangular cross section.

FIG. 6 shows a slightly variational form of the invention which may be considered as identical with that of FIGS. 1 to 5 except that the upper portion 30a of each key 23a is offset slightly radially inwardly relative to the rest of the key, with the result that shoulder surface 31a is slightly reduced in radial extent, and a second shoulder 131a is developed at the inner side of the key. When the key is ultimately driven axially relative to the insert body 10a, and within groove 24a, the surface 131a of portion 30a cams the key slightly outwardly to a position in which portion 30a may move axially into the groove to attain the desired locking action.

FIG. 7 is a view similar to FIG. 3, but showing another form of the invention in which the thicker portion 30b of key 23b is of a substantially rectangular transverse cross section, rather than the circular cross section of the other forms of the invention. Axially inner portion 29b of the key may be shaped the same as portion 29 of FIGS. 1 through 5, and have the same outwardly convexly curved outer surface 33b discussed above, for attaining the defined advantages. Also, the cross section of groove 24b within insert 10b of FIG. 7 may be essentially the same as the grooves of the other forms of the invention.

I claim:

1. The combination comprising an element having external threads to be screwed into internal threads in a recess in a carrier part, and having a groove extending generally axially through and interrupting at least a portion of said external threads, and a locking key received at least partially within said groove and adapted to be driven generally axially therein relative to the element to a predetermined locking position in which the key locks the element against unscrewing rotation, said key having a mounting portion which is confined and retained within a radially inner portion of the groove, radially inwardly of said carrier part threads, and is guided thereby for generally axial sliding movement and which is thin enough radially to enable the element to be screwed into said recess without excessive interference by said mounting portion, said key having a locking portion axially outwardly beyond said mounting portion and projecting radially outwardly farther than said mounting portion and adapted to cut generally axially through the material of the carrier part in locking relation upon said generally axially driven movement of the key, said mounting portion of said key having an axially extending radially outer surface which is dimensioned to be received approximately within a diameter corresponding to the minor diameter of said carrier part threads at locations opposite both the minor diameter and major diameter portions of said carrier part threads, and which, as it advances circularly between two opposite sides of the key and groove, curves convexly and cylindrically about the axis of said external threads, at a diameter corresponding essentially to the minor diameter of said external threads, said mounting portion of the key having a radially inner axially extending planar surface facing radially inwardly toward the axis of said external threads and abutting against a planar inner wall of said groove, said mounting portion having two parallel planar axially extending opposite side surfaces extending perpendicular to said radially inner surface of the mounting portion and extending from said radially inner surface of the mounting portion to said cylindrically curved outer surface thereof, said groove having two opposite side walls which, in extending generally radially outwardly from said inner wall of the groove, have first parallel planar portions tightly frictionally engaging said side surfaces of said mounting portion of the key and extending parallel to one another to approximately the minor diameter of said external threads and to approximately the location of said cylindrically curved surface of the key, and then have second portions converging toward one another in dovetail relation radially outwardly beyond said minor diameter of the external threads and beyond said cylindrical surface of the key, said locking portion of the key being externally essentially cylindrical and defined by a peripheral cylindrical surface centered about and extending substantially entirely about, an axis which is essentially parallel to but offset from the axis of said threads, said cylindrical peripheral surface of said locking portion being substantially tangent at its radially inner side to the plane of said inner wall of the groove, and said cylindrical locking portion being of a width corresponding approximately to the width of the groove between said side walls thereof.

2. The combination as recited in claim 1, in which said peripheral cylindrical surface of said locking portion of the key is substantially tangent at its radially outer side to the planes of said converging portions of said side walls of the groove.

References Cited
UNITED STATES PATENTS

| | | | |
|---|---|---|---|
| 2,367,399 | 1/1945 | Isakson | 151—23 |
| 3,130,765 | 4/1964 | Neuschotz | 151—23 |
| 3,270,792 | 9/1966 | Neuschotz et al. | 151—23 |

CARL W. TOMLIN, *Primary Examiner.*

R. S. BRITTS, *Assistant Examiner.*